United States Patent [19]

Boeckeler

[11] Patent Number: 5,587,433
[45] Date of Patent: Dec. 24, 1996

[54] ESTERS OF HYDROXY TERMINATED POLYBUTADIENE COMPOSITIONS AND METHODS FOR MAKING SAME

[75] Inventor: Rudolph H. Boeckeler, Grafton, Wis.

[73] Assignee: Sartomer Company, Inc., Exton, Pa.

[21] Appl. No.: 516,144

[22] Filed: Aug. 17, 1995

[51] Int. Cl.⁶ ........................................... C08F 36/06
[52] U.S. Cl. ..................... 525/333.2; 525/285; 525/286; 525/385; 525/386
[58] Field of Search ..................... 525/333.2, 386, 525/385, 285, 286

[56] References Cited

U.S. PATENT DOCUMENTS 3,705,208  12/1972  Nakamuta et al. .................. 260/861
5,288,801  2/1994  Ishii et al. .................. 525/92
5,523,337  6/1996  Banerjee et al. .................. 523/436

*Primary Examiner*—Edward J. Cain
*Attorney, Agent, or Firm*—Schnader Harrison Segal & Lewis

[57] ABSTRACT

A method for producing esters of hydroxy terminated polybutadiene, including the steps of: (a) providing an anhydride; (b) reacting a hydroxy terminated polybutadiene with the anhydride to form a carboxyl terminated polybutadiene derivative; (c) reacting the derivative with an epoxide. Also a curable composition, including: (a) an ester of hydroxy terminated polybutadiene; (b) a copolymerizable ethylenically unsaturated monomer; and (c) a drier.

44 Claims, No Drawings

ESTERS OF HYDROXY TERMINATED POLYBUTADIENE COMPOSITIONS AND METHODS FOR MAKING SAME

BACKGROUND OF THE INVENTION

1. Field of the Invention

The present invention relates to hydroxy terminated polybutadiene compositions, and methods for making same, and, in particular, to esters of hydroxylated polybutadiene, and methods for making same. The present invention is also directed to curable and cured compositions comprising esters of hydroxy terminated polybutadiene.

2. Description of the Related Art

Resins prepared with hydroxy terminated polybutadiene possess unique and desirable properties. These properties include low water absorption, low moisture permeability, high hydrolytic stability, high solvent and chemical resistance, excellent low temperature flexibility and good bonding to a variety of substrates. These properties are particularly useful for materials used as coatings, adhesives, caulk, and sealants.

A number of polymers employing esters of hydroxy terminated polybutadiene are known. For example, hydroxy terminated polybutadiene can be reacted rapidly with polyisocyanates to yield tough, elastomeric polymers which have good hydrolytic stability. However, because isocyanates are extremely toxic there are serious environmental and safety concerns associated with the manufacture of such polymers. Alternatively, hydroxy terminated polybutadiene can be esterified either directly with acid or acid chlorides or by transesterification with various esters. Both direct esterification and transesterification, however, are complex and relatively high temperature processes which often lead to instability and generate large toxic waste streams.

It is accordingly an object of this invention to overcome the disadvantages and drawbacks of the known art and to provide stable and safe compositions comprising esters of hydroxy terminated polybutadiene.

It is a further object of this invention to provide stable and safe curable and cured compositions comprising esters of hydroxy terminated polybutadiene.

Further objects and advantages of this invention will become apparent from the detailed description of a preferred embodiment which follows.

SUMMARY OF THE INVENTION

The present invention is directed to a method for producing esters of hydroxy terminated polybutadiene, comprising the steps of: (a) providing an anhydride; (b) reacting a carboxyl terminated polybutadiene with the anhydride to form a carboxyl terminated polybutadiene derivative; and (c) reacting the derivative with an epoxide.

A curable composition, comprising: (a) an ester of hydroxy terminated polybutadiene having the general formula

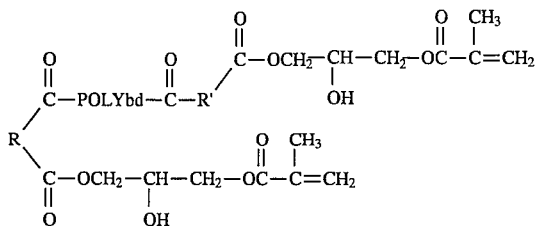

wherein R is an aromatic ring, an aliphatic ring, an alkyl, or an alkene, and R' is an aromatic ring, an aliphatic ring, an alkyl, or an alkene; (b) a copolymerizable ethylenically unsaturated monomer; and (c) a drier.

These and other objects, features, aspects, and advantages of the present invention will become more fully apparent from the following detailed description of the preferred embodiment and the appended claims.

DESCRIPTION OF THE PREFERRED EMBODIMENT(S)

The present invention is based on the discovery that hydroxy terminated polybutadiene can be esterified by reaction with an anhydride to form a derivative which can then be terminated with an epoxide. These reactions produce esters of hydroxy terminated polybutadiene without the use of highly toxic isocyanates and without the complexities and difficulties of direct esterification and transesterification.

The first step in a method of the present invention is to prepare a carboxyl terminated polybutadiene derivative. The carboxyl terminated polybutadiene derivative is prepared by reacting hydroxy terminated polybutadiene with an anhydride having the general formula:

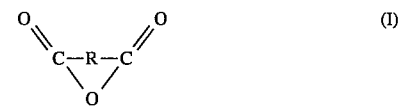

wherein R is an aromatic ring, aliphatic ring, alkyl, or alkene.

Exemplary anhydrides having the general formula (I) include, without limitation, phthalic anhydride, succinic anhydride, maleic anhydride, trimellitic anhydride, hexahydrophthalic anhydride, chlorinated anhydrides such as chlorendic anhydride and tetrachlorophthalic anhydride, methyltetrahydrophthalic anhydride, itaconic anhydride, pyromellitic dianhydride, benzophenonetetracarboxylic dianhydride, and cyclopentanetetracarboxylic dianhydride. Preferred are those anhydrides, such as phthalic anhydride and succinic anhydride, which are highly soluble in hydroxy terminated polybutadiene at relatively low temperatures, i.e. 120° C. and below. Use of such anhydrides allows for the use of lower temperature equipment and, therefore, makes processing easier and less expensive. Mixtures of these anhydrides may also be used.

The amount of the anhydride used is approximately 2–15 wt. percent and is most preferably approximately 5–10 wt. percent.

The hydroxy terminated polybutadiene can be any such hydroxy terminated polybutadiene described in U.S. Pat. No. 3,652,520 (the entire text of which is incorporated herein by reference) beginning at column 3, line 64. As described in U.S. Pat. No. 3,652,520, the hydroxy terminated polybutadiene has the general formula:

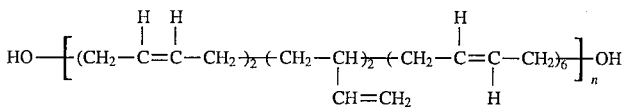

A preferred hydroxy terminated polybutadiene is POLYbd 45HT™ available from elf Atochem Co. The amount of the hydroxy terminated polybutadiene used is preferably 50–90 wt. percent and is most preferably approximately 70–80 wt. percent.

This reaction can be performed in a standard reaction flask in an inert atmosphere, such as a nitrogen atmosphere, at approximately 100° C.–160° C., and preferably 100° C.–120° C., for approximately 1–4 hours. The lower the temperature of the reaction, the lower the viscosity of the product. An amine catalyst, such as methylguanadine, can be used to increase the reaction rate. However, such catalysts may retard curing and are, therefore, not preferred. In this reaction it is desirable to react all of the anhydride since unreacted anhydride will precipitate and/or react with glycidyl acrylate ester.

The carboxyl terminated polybutadiene derivative is then reacted with a glycidyl acrylate ester. Exemplary glycidyl acrylate esters include, without limitation, glycidyl acrylate and glycidyl methacrylate (GMA).

Alternatively, the carboxyl terminated polybutadiene derivative may be reacted with a diepoxide. Exemplary diepoxides include, without limitation, diglycidyl ethers of bisphenol-A, glycidyl ethers of novolac resins, glycidyl ethers of aliphatic polyols and cycloaliphatic epoxides. Where a diepoxide is used a stoichiometric excess of either the diepoxide or the hydroxy terminated polybutadiene is used. If the carboxyl terminated polybutadiene derivative is reacted with a stoichiometric excess of a diepoxide, the residual diepoxide groups are then reacted with an α,β unsaturated carboxylic acid, such as acrylic or methacrylic acid. Alternatively, if a stoichiometric excess of the carboxyl terminated polybutadiene derivative is reacted with a diepoxide, the residual carboxy groups are then reacted with a glycidyl acrylate ester.

When a diepoxide is used, the amount used is preferably approximately 1–10 wt. percent and most preferably approximately 1–5 wt. percent. When glycidyl methacrylate is used, the amount used is preferably approximately 4–20 wt. percent and most preferably approximately 6–12 wt. percent.

In addition to the epoxide and the derivative, catalysts, such as triphenyl stibene (approximately 0–2 wt. percent, preferably 0.5–1.0 wt. percent), triphenyl phosphine (approximately 0–1 wt. percent, preferably 0.2–0.5 wt. percent), and inhibitors, such as toluhydroquinone (approximately 100–1000 ppm, preferably 400–800 ppm), may be added to the reaction mixture. Preferably, the ratio of stibene to phosphine is approximately 3:1. Alternative inhibitors include, without limitation, methyl hydroquinone, hydroquinone, t-butyl hydroquinone, and phenothiazine. Alternative catalysts include, without limitation, quaternary ammonium salts, such as benzyltrimethylammonium chloride (approximately 0–2%, preferably 0.2–0.8%), and chromium compounds, such as $Cr^{+3}$ acetate (approximately 0–1%, preferably 0.2–0.6%). Such catalysts may be present in amounts from about 0% to 2% by weight and, preferably, from about 0.2 to 0.8% by weight.

This reaction can be performed in a standard reaction flask under an air atmosphere at approximately 70°–130° C., preferably at 90°–110° C.

As described above, a preferred embodiment of the present invention comprises the following reactions:

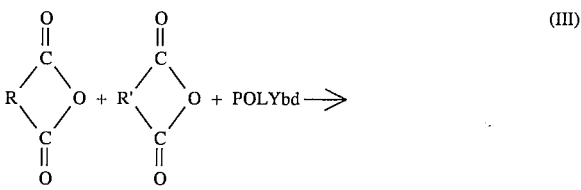

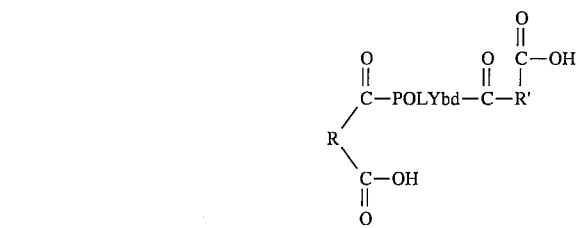

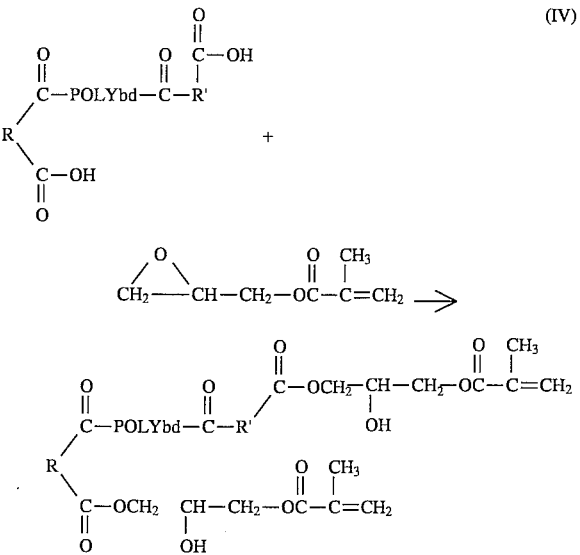

wherein R an aromatic ring, an aliphatic ring, an alkyl, or an alkene, and R' is an aromatic ring, an aliphatic ring, an alkyl, or an alkene and R and R' are the same or different.

In an alternative embodiment of the present invention, the derivative yield of reaction (III) is reacted with a stoichiometric excess of a diepoxide. The residual diepoxide groups are then reacted with an α,β unsaturated carboxylic acid, such as acrylic or methacrylic acid. In yet another alternative embodiment of the present invention, a stoichiometric excess of the derivative yield of reaction (III) is reacted with a diepoxide. The residual carboxyl groups are then reacted with glycidyl methacrylate.

The present invention is also directed to thermally curable compositions and ultraviolet light curable compositions comprising esters of hydroxy terminated polybutadiene. Thermally curable compositions in accordance with the present invention may comprise:

(a) approximately 30–100 parts by weight of an ester of a hydroxy terminated polybutadiene derivative;

(b) approximately 0–70 parts by weight of a copolymerizable ethylenically unsaturated monomer;

(c) approximately 0.005–0.10 parts by weight (metal content) of a drier; and (d) approximately 0.1–2.0 parts by weight of a peroxide or hydroperoxde catalyst; and (e) solvents, oligomers, flow control additives, thixotropes, pigments, dyes, fillers, and the like as desired.

The ester of a hydroxy terminated polybutadiene derivative can be any such ester prepared in accordance with the methods described above.

The copolymerizable ethylenically unsaturated monomer may be mono or polyfunctional acrylic and methacrylic monomers, acrylamides, and vinyl monomers. Acrylates and methacrylates such as 1,6 hexanedioldiacrylate, 1,6 hexanedioldimethacrylate, stearyl methacrylate, tridecylacrylate, tridecylmethacrylate, and phenoxyethylacrylate are preferred.

The drier may be salts of metal valence 2 or more, and saturated and unsaturated organic acids. Suitable metal components of the metal salts include, without limitation, cobalt, manganese, cerium, lead, vanadium, iron, copper, zirconium, and zinc. Suitable organic acids include, without limitation, linoleates, napthenates, octoates, and neodeconates. A preferred drier is cobalt-potassium complex drier (available as NUOCURE CK™ from Hüls, Inc.).

The catalyst can be any catalyst suitable for curing the monomer, including, without limitation, cumene hydroperoxide, 2,5-dimethylhexane 2,5-dihydroperoxide, t-butyl hydroperoxide, dicumylperoxide, benzoyl peroxide, di-t-butyl peroxide, methylethylketone peroxide, t-butyl peroxide, p-methane hydroperoxide, pentanehydroperoxide. Most preferred are cumene hydroperoxide and 2,5-dimethylhexane 2,5-dihydroperoxide (available as LUPERSOL™ 2,5 2,5, supplied by Pennwalt Corp.).

Compositions according to the present invention may also be prepared for use in ultraviolet and electron beam curing systems. In ultraviolet systems, a photoinitiator is substituted for the peroxide or hydroperoxide catalyst. Suitable photoinitiators include, without limitation, isobutyl benzoin ether, 2,2 dimethoxy-2-phenyl acetophenone, hydroxy cyclohexyl phenyl ketone, diethoxyacetophenone, 2-hydroxy-2-methyl-1-phenyl propane-1-one, benzophenone, 2-chlorothioxanthone, 2,4,6 trimethylbenzoyldiphenyl phosphine oxide. In an electron beam system, no catalyst is necessary.

Compositions according to the present invention may also comprise solvents, oligomers, flow control additives, thixotropes, pigments, dyes, fillers, antioxidants, dispersing aids, stabilizers and others additives that may be desirable depending on the end use of the composition.

Compositions according to the present invention may be prepared for application in any conventional manner. Notably, it is important to avoid mixing the peroxide and the drier simultaneously. The compositions may be utilized in a variety of settings such as coatings, adhesives, sealants, caulks, electrical coatings, and the like. The compositions of the present invention may be applied to the substrate by any conventional means such as dipping, spraying, roller coating or the like.

The invention will be clarified further by a consideration of the following examples, which are intended to be purely exemplary.

EXAMPLES

Example 1

1217.3 grams hydroxy terminated polybutadiene (POLYbd 45HT™, supplied by elf Atochem Co.) and 117 grams succinic anhydride were placed into a reaction flask equipped with an agitator, liquid addition funnel, thermometer, and gas inlet tube. This mixture was heated under nitrogen atmosphere to 160° C. and maintained at this temperature for 1½ hours.

The contents of the flask were then cooled to 85° C. and the nitrogen atmosphere was replaced by air. 10.4 grams triphenyl antimony, and 3.6 grams triphenyl phosphine, 0.9 grams toluhydroquinone, and 167.3 grams glycidyl methacrylate were added to the flask. This mixture was stirred at 90° to 110° C. for 8 hours.

The resulting product was a dark amber colored liquid having a viscosity of 3625 cps at 60° C., an acid value of 7.9 and an epoxy equivalent weight of 11,500.

Example 2

986.5 grams POLYbd 45HT™ and 86.6 grams succinic anhydride were placed into a flask equipped with an agitator, liquid addition funnel, thermometer, and gas inlet tube. This mixture was heated to 160° C. under nitrogen blanket. After one hour and 35 minutes at this temperature the mixture had an acid value of 41.2

The mixture was then cooled to 90° C. and 32.4 grams of liquid diglycidyl ether of bisphenol A (DER 332™, supplied by DOW Chemical Co.), 10.5 grams triphenyl stibene, 3.3 grams triphenyl phosphine and 0.9 grams toluhydroquinone were added. This mixture was held for 2½ hours at 90–110° C. at which time the acid value fell to 31.6.

The nitrogen atmosphere was then replaced by air and 90.0 grams glycidyl methacrylate was added. This mixture was held under agitation at 100°–110° C. for 4½ hours.

The resulting resin was an amber colored liquid with an acid value of 2.7, viscosity of 7500 cps at 60° C. and an epoxy equivalent weight of 20,100.

Example 3

Preparation and Testing of Peroxide Curable Coatings

A peroxide curable coating composition was prepared by combining 80 grams of the resin prepared in Example 1, 0.4 grams 10% cobalt-potassium complex drier (NUOCURE CK™, supplied by Hës Inc.), 20 grams 1,6 hexanediodiacrylate, 1.5 grams cumene hydroperoxide and 10 grams xylene.

The coating composition was applied by means of a 3 mil draw down bar to a glass plate. The coated plate was placed in an oven held at 88° C. for 10 min. The cured film had a surface free of tack and could not be marred by rubbing the back of a fingernail across it. The film was unaffected by 100 double rubs with a rag soaked with methyl ethyl ketone.

A 3 mil draw down of the same coating composition was applied to a glass plate and allowed to stand at room temperature for 16 hours. The resulting film was tack free, mar resistant, and softened after 60 rubs with methyl ethyl ketone.

Example 4

Preparation of Pigmented Peroxide Curable Coating

A white pigmented paint was prepared by combining a pigment grind paste including of 8.0 grams of the resin prepared in Example 2, 8.0 grams xylene, 32.9 grams rutile titanium dioxide, 0.33 grams ANTITERRA 207™ (antisetting agent, supplied by Byk Chemie), and 0.73 grams DISPERBYK 165™ (pigment grinding aide, supplied by Byk Chemie) with 25 grams of the resin prepared in example 2, 0.7 grams 2,5-dimethylhexane 2,5-dihydroperoxide (LUPERSOL 2,5 2,5™, supplied by Pennwalt Corp.) and 0.2 grams Cobalt-Potassium Complex (NUOCURE CK™, supplied by Hüs Inc.).

The peroxide curable coating composition was drawn down onto a cold rolled steel panel with a 1.5 mil film applicator. The coated panel was placed in an oven held at 70° C. for 30 minutes. The cured film was non-tacky, mar resistant and possessed gloss of 78 and 86, on 20° and 60° Gardner Gloss Meters, respectively.

Example 5

1246 grams hydroxy terminated polybutadiene 45HT and 148 grams phthalic anhydride were placed into a reaction flask equipped with an agitator, liquid addition funnel, thermometer, and gas inlet tube. This mixture was heated and stirred under nitrogen at 95°–110° C. for 3 hours. At this point the mixture was a clear amber liquid with an acid value of 38.2, free anhydride content of 1.0% and Gardner bubble viscosity of Z1 when reduced to 80% resin solids in xylene.

The contents of the flask were then cooled to 90° C. and the nitrogen atmosphere was replaced by air atmosphere. 11.0 grams triphenyl antimony, 3.7 grams triphenyl phosphine, 0.9 grams toluhydroquinone, and 137 grams glycidyl methacrylate were added to the flask. This mixture was stirred for 7 hours at 90° C.

The resulting polybd methacrylate was an amber colored liquid having a viscosity of 3750 cps at 60° C., an acid value of 3.6, and an epoxy equivalent weight of 16,460. After 4 days dark storage in a glass container at 60° C. the viscosity was 3875 cps at 60° C.

Example 6

Preparation and Testing of Ultraviolet Light Curable Coatings

A UV curable coating was prepared by combining 40 grams of the resin prepared in Example 5, 10 grams of 1,6 hexanedioldiacrylate (SR 238™ supplied by Sartomer Co., Inc.) and 2 grams of 2-hydroxy-2-methyl-1-phenyl propane-1-one (DAROCURE 1173™ supplied by Ciba-Geigy Corp.).

The UV coating composition was applied to a phosphate treated cold rolled steel panel by means of a 3 mil draw down bar and exposed to UV radiation from a 200 watt per inch mercury vapor lamp. After 2 passes under the lamp at a speed of 100 feet per minute the coating was free of surface tack and after 3 passes it could not be marred by rubbing the back of a fingernail across the surface. The coating softened slightly after doubly rubbing 100 times with a rag soaked in methyl ethyl ketone.

The above UV cured coating was placed in a Cleveland Humidity cabinet set at 39° C. After 30 days exposure to this environment no softening, pitting, delamination, panel rusting, or other defects were observed.

Other embodiments of the invention will be apparent to those skilled in the art from a consideration of this specification or practice of the invention disclosed herein. It is intended that the specification and examples be considered as exemplary only, with the true scope and spirit of the invention being indicated in the following claims.

What is claimed is:

1. A method for producing esters of hydroxy terminated polybutadiene, comprising the steps of:
   (a) providing an anhydride;
   (b) reacting a hydroxy terminated polybutadiene with the anhydride to form a carboxyl terminated polybutadiene derivative;
   (c) reacting the derivative with an epoxide.

2. The method of claim 1, wherein the anhydride has the general formula:

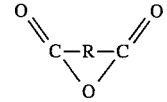

and R is an aromatic ring (I), aliphatic ring, alkyl, or alkene.

3. The method of claim 1, wherein the anhydride solubilizes in hydroxy terminated polybutadiene under approximately 120° C.

4. The method of claim 1, wherein the anhydride is phthalic anhydride, succinic anhydride, maleic anhydride, trimellitic anhydride, hexahydrophthalic anhydride, chlorendic anhydride, tetrachlorophthalic anhydride, methyltetrahydrophthalic anhydride, itaconic anhydride, pyromellitic dianhydride, benzophenonetetracarboxylic dianhydride, or cyclopentanetetracarboxylic dianhydride.

5. The method of claim 1, wherein the anhydride is phthalic anhydride.

6. The method of claim 1, wherein the anhydride is succinic anhydride.

7. The method of claim 1, wherein the amount of the anhydride is from about 2 to 15 weight percent.

8. The method of claim 1, wherein the amount of the anhydride used is from about 5 to 10 weight percent.

9. The method of claim 1, wherein the hydroxy terminated polybutadiene comprises approximately 20% cis unsaturation and approximately 60% trans unsaturation.

10. The method of claim 1, wherein the amount of the hydroxy terminated polybutadiene used is from about 50 to 90 weight percent.

11. The method of claim 1, wherein the amount of the hydroxy terminated polybutadiene used is from about 70 to 80 weight percent.

12. The method of claim 1, wherein step (b) is conducted at a temperature from about 100° C. to about 160° C.

13. The method of claim 1, wherein step (b) is conducted at a temperature from about 100° C. to about 120° C.

14. The method of claim 1, wherein the epoxide is glycidyl acrylate.

15. The method of claim 1, wherein the epoxide is glycidyl methacrylate.

16. The method of claim 15, wherein the amount of glycidyl methacrylate used is from about 4 to 20 weight percent.

17. The method of claim 15, wherein the amount of glycidyl methacrylate used is from about 6 to 12 weight percent.

18. The method of claim 1 wherein the epoxide is a diepoxide.

19. The method of claim 18, wherein the diepoxide is a diglycidyl ether of bisphenol-A, a glycidyl ether of a novolac resin, a glycidyl ether of an aliphatic polyol, or a cycloaliphatic epoxide.

20. The method of claim 18, wherein the epoxide is a diglycidyl ether of bisphenol-A.

21. The method of claim 18, wherein a stoichiometric excess of the diepoxide is used.

22. The method of claim 18, wherein a stoichiometric excess of the carboxy terminated polybutadiene derivative is used.

23. The method of claim 18 wherein the amount of diepoxide used is from about 1 to 10 weight percent.

24. The method of claim 18, wherein the amount of diepoxide used is from about 1 to 5 weight percent.

25. The method of claim 21, further comprising the step of:

(d) reacting the product of step (c) with an $\alpha,\beta$ unsaturated carboxylic acid.

26. The method of claim 22, further comprising the step of:

(d) reacting the product of step (c) with glycidyl methacrylate.

27. The method of claim 1, further comprising the steps of:

(d) adding a catalyst; and (e) adding an inhibitor.

28. The method of claim 27, wherein:

the catalysts include triphenyl stibene and triphenyl phosphine; and the inhibitor includes toluhydroquinone.

29. The method of claim 1, wherein step (c) is performed at approximately 70° C.–130° C.

30. The method of claim 1, wherein step (c) is performed at approximately 90° C.–110° C.

31. A curable composition, comprising:

(a) an ester of hydroxy terminated polybutadiene having the general formula

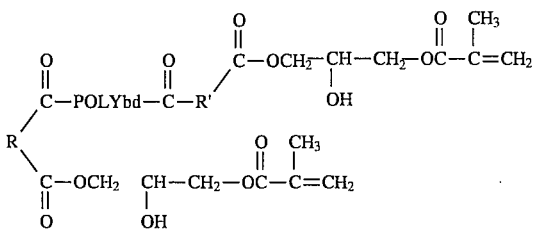

wherein R is an aromatic ring, an aliphatic ring, an alkyl, or an alkene, and R' is an aromatic ring, an aliphatic ring, an alkyl, or an alkene;

(b) a copolymerizable ethylenically unsaturated monomer; and (c) a drier.

32. The composition of claim 31, further comprising:

(d) a catalyst.

33. The composition of claim 31, wherein the monomer is a mono acrylic monomer, a methacrylic monomer, an acrylamide, or a vinyl monomer.

34. The composition of claim 31, wherein the monomer is 1,6 hexanedioldiacrylate, 1,6 hexanedioldimethacrylate, stearyl methacrylate, tridecylacrylate, tridecylmethacrylate, or phenoxyethylacrylate.

35. The composition of claim 31, wherein the monomer is 1,6 hexanedioldiacrylate.

36. The composition of claim 31, wherein the drier is a metal salt of valence 2 or more.

37. The composition of claim 31, wherein the drier is an organic acid.

38. The composition of claim 31, wherein the drier is cobalt-potassium complex drier.

39. The composition of claim 32, wherein the catalyst is a peroxide or hydroperoxide catalyst.

40. The composition of claim 32, wherein the catalyst is cumene hydroperoxide, 2,5-dimethylhexane 2,5-dihydroperoxide, t-butyl hydroperoxide, dicumylperoxide, benzoyl peroxide, di-t-butyl peroxide, methylethylketone peroxide, t-butyl peroxide, p-methane hydroperoxide, or pentanehydroperoxide.

41. The composition of claim 32, wherein the catalyst is cumene hydroperoxide.

42. The composition of claim 32, wherein the catalyst is 2,5-dimethylhexane 2,5-dihydroperoxide.

43. The composition of claim 32, wherein the catalyst is a photoinitiator.

44. The composition of claim 43, wherein the photoinitiator is 2-hydroxy-2-methyl-1-phenyl propane-1-one.

* * * * *